United States Patent [19]

Cosman

[11] Patent Number: 5,767,816
[45] Date of Patent: Jun. 16, 1998

[54] FERRITE CORE MARKER

[75] Inventor: Armond D. Cosman, Austin, Tex.

[73] Assignee: Minnesota Mining and Manufacturing Company, St. Paul, Minn.

[21] Appl. No.: 393,105

[22] Filed: Feb. 22, 1995

[51] Int. Cl.$^6$ .................................................. H01Q 7/08
[52] U.S. Cl. ..................... 343/788; 343/719; 343/787
[58] Field of Search ......................... 343/722, 797, 343/719, 787, 788; H01Q 1/00, 7/08

[56] References Cited

U.S. PATENT DOCUMENTS

| | | | |
|---|---|---|---|
| 2,539,476 | 1/1951 | Rines | 343/787 |
| 2,624,004 | 12/1952 | Polydoroff | 343/788 |
| 2,702,860 | 2/1955 | Farbanish | 343/788 |
| 2,755,468 | 7/1956 | Mountjoy | 343/787 |
| 3,051,103 | 8/1962 | Morrow | 343/787 |
| 3,564,551 | 2/1971 | Mills et al. | 343/787 |
| 3,569,972 | 3/1971 | McEvoy | 343/787 X |
| 3,836,842 | 9/1974 | Zimmermann et al. | 324/34 |
| 4,148,036 | 4/1979 | Miller | 343/788 |
| 4,811,030 | 3/1989 | Pedersen | 343/788 |

FOREIGN PATENT DOCUMENTS

| | | | |
|---|---|---|---|
| 123557 | 10/1984 | European Pat. Off. | G08B 13/24 |
| 309359 | 3/1989 | European Pat. Off. | H01F 3/14 |
| 444522 | 9/1991 | European Pat. Off. | H01F 3/14 |
| 471864 | 2/1992 | European Pat. Off. | H01F 3/14 |
| PCT/DK82/ 00090 | 4/1983 | WIPO | G01C 15/04 |

Primary Examiner—Donald T. Hajec
Assistant Examiner—Tho Phan
Attorney, Agent, or Firm—Gerald F. Chernivec; John C. McFarren

[57] ABSTRACT

A passive electronic marker uses a plurality of ferrite cores to increase locating range, and the cores are attached in such a manner that a slight bend of the marker at a junction between the cores does not significantly affect the markers performance. Stable locating range and tuned frequency are achieved by controlling the air gap between the cores, using specially shaped ends or a sphere which is positioned between the cores. By selecting the appropriate geometry for the core ends and winding interconnections, the first order permeability across the air gap is held constant during bending of the marker.

20 Claims, 1 Drawing Sheet

FERRITE CORE MARKER

BACKGROUND OF THE INVENTION

1. Field of the Invention

The present invention generally relates to devices which use electromagnetic signals to mark or locate obscured articles and more particularly to passive resonant circuits having ferrite cores, which are used to mark, eg., buried cables and pipe.

2. Description of the Prior Art

When burying service conduits, such as telecommunications and power cables, or gas and water pipes, it is desirable to provide a mechanism for easily locating the conduits at a future date, whether for access purposes such as maintenance and repair, or to determine the location so the conduit may be avoided when digging in the is area for other purposes. Many different conventional techniques are employed to locate underground conduits, including systems which use transmit electromagnetic signals to detect buried markers. The markers range from simple iron rods and permanent magnets, to more complicated interrogatable markers. These devices are generally either "passive," meaning that they are powered solely by the signal transmitted from the locating device above ground, or "active," meaning that they have some local power source such as a battery. A good discussion of various types of underground markers and marking systems may be found in U.S. Pat. No. 3,836,842.

The present invention is directed to a class of passive electronic markers which use a coil of wire (an inductor) and a capacitor to form a resonant "LC" circuit. This type of passive making device is basically a high Q resonant circuit which will absorb an electromagnetic signal at or near its resonant frequency and then re-emit the same signal with an exponentially decaying amplitude. It is known to use ferrite rods for the cores of the coils to increase the Q of the circuit and hence its locating range. For example, U.S. Pat. No. 4,811,030 allows the mounting of different coil/capacitor packages onto identical cores, and more than one LC circuit can be mounted on the same core to provide multiple resonant frequencies.

The length of the core in a ferrite core marker is a first order relation to the marker's antenna loop aperture so, to obtain a larger operating range, the core can be lengthened, however, the loser a core, the more likely it will become damaged or fractured, forming an air gap, with a resulting frequency shift and effective loss of locating range If a transverse fracture forms in the core outside of the coil windings, the flux in the two portions of the core will not be the same since part of the flux in the coil portion of the core near the fracture must return lo that portion of the core but at to the other end thereof If the fracture forms in the core and within the coil windings, the flux in the two portions will be the same since flux trying to leak out at the air gap finds a field sustained there by the windings, making the continuing flux path easy across the fracture. While the operation of the marker may therefore be unaffected under perfect conditions, this is not the case if the core is subjected to stress, which is easy to do when burying a marker If the marker is placed under bending stress, the core will hinge at a peripheral point of the fracture, increasing the air gap and resulting in a deviation of the inductance and thus in frequency of the circuit. Stress in the ferrite rod below the breaking point also shifts its effective permeability resulting in a loss in detection range '842 patent recognizes the problem of long rods fracturing It teaches the use of a sintered ferrite core having an encapsulant which, when cured, is at least as brittle as the ferrite core so that the core is not only mechanically reinforced, but further so that serious stress or physical damage to the core will be apparent upon visual inspection of the encapsulating layer Hard, stiff cases can certainly minimize damage during installation of the markets, but the cores can still be damaged during assembly for the markers, and provision of a more durable housing for the marker increases its cost and often its size. It would, therefore, be desirable to devise a ferrite core marker which allowed for an effectively longer size ferrite core, with a corresponding increase in locating range, but which avoids the detrimental effects associated with fracturing of long ferrite rods. It would further be advantageous if such a marker were constructed in a simple and cost-effective manner

SUMMARY OF THE INVENTION

The present invention provides a passive electronic marker generally comprising at least two elongate members formed of ferromagnetic material (such as cylindrical ferrite rods) having ends which are located proximate one another to define a gap therebetween a resonant LC circuit which includes a wire coiled about a portion of both ferromagnetic members and a capacitor connected to the wire, and means for controlling the gap a said ferromagnetic members are bent at the gap such that the electromagnetic permeability across the gap remains substantially constant. In this manner, the operating range and tuned frequency of the marker remain unchanged. The gap controlling means preferably includes both means forcibly urging the ends of the ferromagnetic members toward each other, and means biasing said first and second ferromagnetic members toward linear alignment but allowing said members to bend at said gap. This latter means may take the form of an elastomeric sleeve which surrounds the ends of the ferromagnetic members and the gap.

The ends of the ferromagnetic members may have a frusto-conical shape with these ends being in direct contact with each other. Alternatively, the ends may be flat and orthogonal to the rod length, and a sphere may be located between, and in contact with the flat ends of the ferromagnetic members. The sphere may be constructed of any durable material including ferromagnetic materials as well as nonferromagnetic materials such as polymers. If the aforementioned elastomeric sleeve is used in this alternative embodiment, then the sphere should have a diameter which is sufficiently large such that, when the ferromagnetic members are bent at the gap, the sleeve engages the sphere and maintains it axially centered with respect to the ferromagnetic members and, more preferably, the sphere diameter is equal to the diameter of the cylindrical ferrite rods. As a further variation, instead of flat end faces, the ferrite rod ends may have conical sockets formed therein for receiving a portion of the sphere. In yet a further refinement, the sockets may be smaller and formed in tapered ends of the ferrite rods, with the sphere being smaller, e.g., having a diameter which is less than half diameter of the rods.

Markers of indefinite length (and variable shape) may be constructed using this joining technique with multiple ferrite rods.

BRIEF DESCRIPTION OF THE DRAWINGS

The invention will best be understood by reference to the accompanying drawings, wherein.

DESCRIPTION OF THE PREFERRED EMBODIMENT

Figure 1:
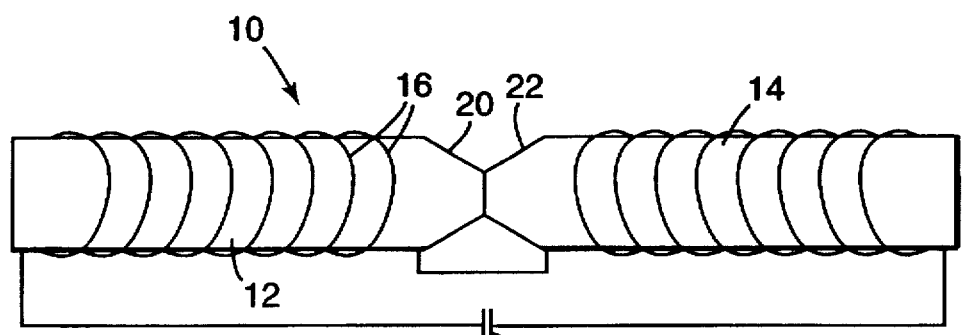
FIG. 1 is one embodiment of a ferrite core marker constructed in in accordance with the present invention, having ferrite rods whose ends are frustoconical and in direct contact.

With reference now to the figures, and in particular with reference to FIG. 1, there is depicted one embodiment 10 of the passive electronic marker of the present invention. Marker 10 is generally comprised of first and second ferrite rods 12 and 14, a wire 16 which is coiled about a portion of both rods 12 and 14 to form an inductor, and a capacitor 18 which is connected to the inductor (i.e., to the free ends of wire 16) to form a resonant LC circuit. In this embodiment, the ends 20 and 22 of rods 12 and 14, respectively, are each frusto-conical in shape, i.e., tapered or chamfered and having a flat central portion, and these end faces are in direct electrical contact. The rods need not be made specifically of ferrite, but rather any ferromagnetic material will suffice. Also, rods 12 and 14 need only be generally elongate, but they are preferably cylindrical in shape and are advantageously identical to simplify parts requirements. Conventional means may be used to package and protect these components, for example, a tubular housing formed of a durable material such as polyethylene, or a waterproof encapsuled such as epoxy that is formed about the components and cured. Such packaging also serves to forcibly urge the ends of the ferrite rods together, and to maintain the ferrite rods in general linear alignment, while still allowing the overall marker to bend slightly.

Marker 10, as well as the other embodiments discussed below, can be detected using conventional instruments, such as transceivers which first emit an electromagnetic signal at the resonant frequency of the marker and then listen for a return echo from it. Those instruments are outside the scope of the present invention.

Even if rods 12 and 14 are pressed hard againsteach other, there will be a microscopic "air gap"between them that affects the operating characteristics of the markers. In the present invention, however, the air gap is controlled such that if the marker is bent, the electromagnetic permeability across the gap remains substantially constant, that is, there is no change in the first order permeability. In the embodiment of marker 10, the air gap is so controlled by selecting an appropriate angle for the frusto-conical taper of the ends 20 and 22 (specific values are discussed below). Rounded tips could be used instead of frusto-conical tips, although the latter is deemed more preferable since the flat central portions tend to bias the ferrite rods in more of a straight line. If the distance across the flat central portion is small compared to the diameter of the rods, then the rods will hinge about their axes such that the bottom of the gap closes at the same rate the top of the gap opens, with a minimum change in inductance. In this manner, an effectively longer size ferrite core may be provided, with a corresponding increase in operating range, but without the detrimental effects associated with fracturing of long ferrite rods. Specifically, the marker can be bent at the gap considerably without breaking it, and testing has shown that such bending does not significantly change its tuned frequency.

Since the same current flows in each portion of the coil winding, and the winding traverses the air gap, the flux in the rods tends to equalize and retain the flux in the ferrite cores. The first order field at the end of one rod to the current will be the same as that the end of the other rod if the wire is uniformly coiled across the air gap, i.e., the turn on one side of the air gap is approximately equal to the turn spacing on the other side of the air gap. This tends to reduce any flux leakage from the gap since it is easier for the flux to continue across the air gap.

Those skilled in the at will appreciate that markets of indefinite length (and variable shape) may be constructed using this joining technique with multiple ferrite rods. Such variation may include, for example, toroids.

Figure 2:
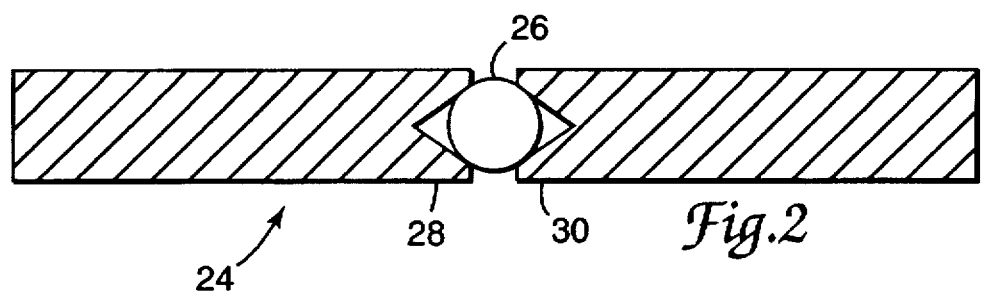
FIG. 2 is another embodiment of ferrite core marker constructed in accordance with the present invention, with ferrite rods whose ends have sockets which receive portions of a common sphere.
Figure 3:
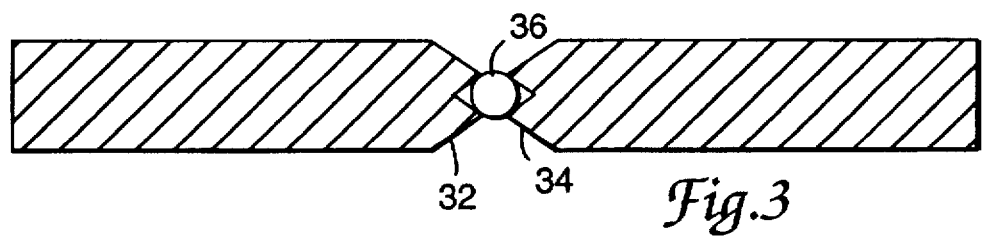
FIG. 3 is yet another embodiment of a ferrite core marker constructed in accordance with the present invention, similar to that of FIG. 2, but the sockets are formed in tapered ends of the ferrite rods.
Figure 4:
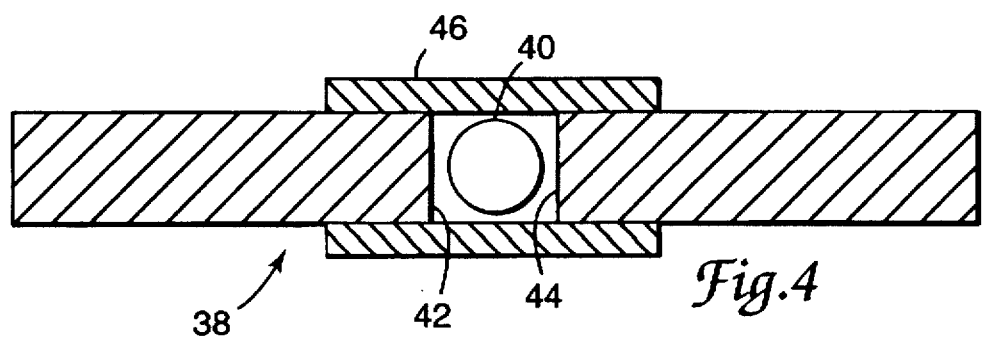
FIG. 4 is still another embodiment of a ferrite core marker constructed in accordance with the present invention, having ferrite rods whose ends are flat and are in contact with a common sphere which is held in place by an elastomeric sleeve.

With further reference to FIG. 2, in alternative marker design 24 is depicted which uses a sphere 26 to control the air gap between the ferrite rods (the wire coil and capacitor are omitted from FIGS. 2–4). In this embodiment, the ends 28 and 30 have conical sockets formed therein for receiving a portion of the sphere. In this embodiment, the diameter of the sphere is preferably less than the diameter of the ferrite rods. An equivalent design would provide only one end with a socket, the other end being tapered of rounded to fit in the socket. Either construction offers the same low change in first order inductance during bending, as the design of FIG. 1.

A similar design is shown in FIG. 3, but the ends 32 and 34 of the rods are tapered, and smaller sockets are formed in the tapered ends. The ball 36 is accordingly smaller, preferably having a diameter less than half the diameter of the rods. The use of a smaller ball more securely locks the two rod centers together and forces the hinge point on the axes of the rods, and can still allow the air gap to be controlled by the cone angle and length.

FIG. 4 illustrates another embodiment 38 of the present invention which also uses a sphere 40 at the rod ends to control the air gap. In this embodiment, the ends 42 and 44 of the rods are flat, the end faces are generally orthogonal to the respective axes of the rods, and a flexible sleeve 46 surrounds the ends and sphere 40. The flexible sleeve is preferably formed of a durable elastomer such as EPDM or of a thermoplastic (heat recoverable) sleeve formed of a polyolefin, and serves not only to maintain the ends in proximity, but also biases the rods into general linear alignment while allowing them to bend at the junction between the rods. Sleeve 46 should have a relaxed diameter which is smaller than the diameter of the rods. The diameter of sphere 40 is preferably equal to the diameter of the rods, to prevent the sphere from moving off center during deflection of the rods, although the sphere's diameter could be less than the rods' diameter provided that the elastomeric sleeve has a very small relaxed diameter and squeezes inwardly enough to capture and center sphere 40. Sleeve 46 can optionally be used with any of the foregoing embodiments.

The dimensions of the various components of the foregoing embodiments may vary considerably depending upon the particular application. The following approximate values are considered exemplary, and are generally based on the use of cylindrical ferrite rods having a diameter of 10 mm. For the embodiment 10 of FIG. 1, the ends of the rods have a 60° taper leaving a flat central portion having a diameter of 5 mm. The length of an individual rod is preferably no longer than 5 cm. For the embodiment 24 of FIG. 2, the conical socket has an included angle of 60°, and sphere 26 is 4 mm in diameter. In the variation of FIG. 3, ball 36 has a diameter of 2 mm. The ends 32 and 34 of the rods have a 60° taper, and the sockets have an angle of 60°. For the embodiment 38 of FIG. 4, the sphere has a diameter of 10 mm (the same as the diameter of the rods, as previously noted). The capacitance of capacitor 18, as well as the wire gauge and turn spacings of the coil, may be selected in accordance with known techniques to produce a desired resonant frequency.

Although the invention has been described with reference to specific embodiments, this description is not meant to be construed in a limiting sense. Modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A device for electronically marking an obscured article, the device comprising:

at least two elongate members formed of ferromagnetic material, a first of said ferromagnetic members having first second ends, and a second of said ferromagnetic members having first and second ends, said first end of said first ferromagnetic members being located proximate said first end of said second ferromagnetic member, defining a gap there between;

an electrically conductive wire coiled about a portion of said first ferromagnetic member and a portion of said second ferromagnetic member, said coiled wire forming a conductor;

a capacitor connected to said inductor to form a resonant electrical circuit; and means for controlling said gap as said ferromagnetic members are bent at said gap such that electromagnetic permeability across said gap remains substantially constant.

2. The device of claim 1 wherein said gap controlling means includes means forcibly urging said first end of said first ferromagnetic member toward said first end of said second ferromagnetic member.

3. The device of claim 2 wherein said gap controlling further includes means biasing said first and second ferromagnetic members toward linear alignment but allowing said members to bend at said gap.

4. The device of claim 1 wherein said gap controlling means includes means biasing said first and second ferromagnetic members toward linear alignment but allowing said members to bend at said gap.

5. The device of claim 4 wherein said biasing means includes an elastomeric sleeve surrounding said first ends of said ferromagnetic members and said gap.

6. The device of claim 1 wherein said gap controlling means includes a sphere located between, and in contact with, said first ends of said first and second ferromagnetic members, said sphere also being constructed of a ferromagnetic material.

7. The device of claim 6 wherein:

said biasing means includes an elastomeric sleeve surrounding said first ends of said ferromagnetic members and said gap; and said sphere has a diameter which is sufficiently large such that, when said ferromagnetic members are bent at said gap, said sleeve engages said sphere and maintains said sphere axially centered with respect to said ferromagnetic members.

8. The device of claim 1 wherein each of said first ends of said first and second ferromagnetic members have a frusto-conical shape and said first ends are in contact with each other.

9. The device of claim 1 further comprising:

a third ferromagnetic member having first and second ends, said first end of said third ferromagnetic member being located proximate said second end of said second ferromagnetic member, defining a second gap therebetween, said wire being coiled about a portion of said third ferromagnetic member; and means for controlling said second gap as said second and third ferromagnetic members are bent at said second gap such that electromagnetic permeability across said second gap remains substantially constant.

10. A passive electronic marker comprising:

first and second elongate members formed of ferromagnetic material, each having first and second ends, said first end of said first ferromagnetic member being located proximate said first end of said second ferromagnetic member, defining a gap therebetween;

an electrically conductive wire coiled about a portion of said first ferromagnetic member and a portion of said second ferromagnetic member, said coiled wire forming an inductor;

a capacitor connected to said inductor to form a resonant electric circuit;

means forcibly urging said first end of said first ferromagnetic member toward said first end of said second ferromagnetic member; and means biasing said first and second ferromagnetic members toward generally linear alignment but allowing said members to bend at said gap.

11. The passive electronic marker of claim 10 further comprising a sphere located between, and in contact with, said first ends of said first and second ferromagnetic members, said sphere also being constructed of a ferromagnetic material.

12. The passive electronic marker of claim 11 wherein at least one of said first ends of said first and second ferromagnetic members has a socket formed therein for receiving a portion of said sphere.

13. The passive electronic marker of claim 12 wherein said socket is formed in a tapered one of said first ends of said first and second ferromagnetic members.

14. The passive electronic marker of claim 11 wherein:

said first and second ferromagnetic members are cylindrical and have approximately equal diameters;

said biasing means includes an elastomeric sleeve surrounding said first ends of said ferromagnetic members and said gap; and said sphere has a diameter which is approximately equal to said diameter of said cylindrical, ferromagnetic members.

15. The passive electronic marker of claim 10 wherein each of said first ends of said first and second ferromagnetic members have a frusto-conical shape and said first ends are in contact with each other.

16. The passive electronic marker of claim 10 wherein said wire is coiled about said first end of said first ferromagnetic member with a turn spacing which is approximately equal to the turn spacing of that portion of the wire which is coiled about said first end of said second ferromagnetic member.

17. A passive electronic marker comprising:

first and second ferrite rods, each having first and second ends, said first end of said first ferrite rod being located proximate said first end of said second ferrite rod, defining a gap therebetween;

an electrically conductive wire coiled about a portion of said first ferrite rod and a portion of said second ferrite rod, said coiled wire forming an inductor;

a capacitor connected to said inductor to form a resonant electrical circuit;

means forcibly urging said first end of said first ferrite rod toward said first end of said second ferrite rod;

means biasing said first and second ferrite rods toward generally linear alignment but allowing said rods to bend at said gap; and a sphere located between, and in contact with, said first ends of said first and second ferrite rods, said sphere being constructed of a ferromagnetic material.

18. The passive electronic marker of claim 17 wherein each of said first ends of said first and second ferrite rods has a conical socket formed therein for receiving a portion of said sphere.

19. The passive electronic marker of claim 18 wherein:

said first and second ferrite rods are cylindrical, having approximately equal diameters, and said first ends thereof are tapered, said sockets being formed in said tapered ends; and said sphere has a diameter which is less than half said diameter of said rods.

20. The passive electronic marker of claim 17 wherein:

said first and second ferrite rods are cylindrical, having approximately equal diameters, and said first ends thereof have surfaces which are flat and orthogonal to the length of said rods, respectively;

said biasing means includes an elastomeric sleeve surrounding said first ends of said ferrite rods and said gap; and said sphere has a diameter which is approximately equal to said diameter of said cylindrical, ferrite rods.

* * * * *